(Model.)

B. BENAS & J. FLÖGEL.
DECORATING GLASSWARE.

No. 257,643. Patented May 9, 1882.

WITNESSES:
Gustave Dieterich
Otto Risch

INVENTOR:
Benjamin Benas
and Josef Flögel
BY Paul Goepel
ATTORNEYS.

UNITED STATES PATENT OFFICE.

BENJAMIN BENAS AND JOSEF FLÖGEL, OF BROOKLYN, NEW YORK.

DECORATING GLASSWARE.

SPECIFICATION forming part of Letters Patent No. 257,643, dated May 9, 1882.

Application filed October 6, 1881. (Model.)

*To all whom it may concern:*

Be it known that we, BENJAMIN BENAS and JOSEF FLÖGEL, both of Brooklyn, in the county of Kings and State of New York, have invented certain new and useful Improvements in Decorating Glassware, of which the following is a specification.

The object of our invention is to furnish an improved process of frosting glassware and of decorating the same in such a manner that entirely new effects are obtained.

The invention consists in applying to the surface of the articles to be decorated, by means of a suitable flux, a properly granulated composition, consisting of red lead, quartz, boric acid, and potash, with a small addition of bismuth, and submitting the article in a muffle to the fusing temperature of the composition. The composition may also be colored with metallic oxides and used in the form of a powder for painting ornamental designs upon a part of the surface of the article, the colored portions being finally burned in one fire with the frosted portions.

Figure 1:
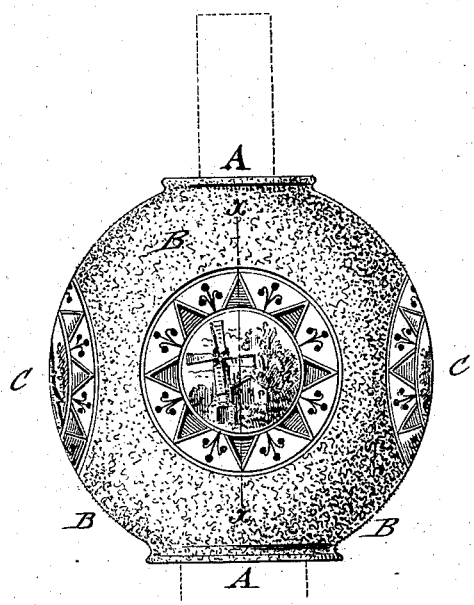
Figure 2:
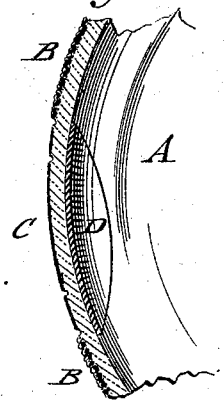

In the accompanying drawings, Figure 1 represents a side view of a glass globe manufactured according to our improved process, and Fig. 2 a detail vertical transverse section of the same on line *x x*, Fig. 1.

Similar letters of reference indicate corresponding parts.

In carrying out our invention a flint-glass object, A—such as a lamp globe, shade, or other article—is covered on its entire surface or on such parts only as are intended to be brought out in frosted character, by means of a suitable flux, with a layer, B, of a granulated composition which is made of a mixture of seven parts of red lead, five parts of quartz, six parts of boric acid, two parts of potash, and one and one-half part of bismuth. The composition may be either plain or colored, so that thus any desired tint can be produced. It is granulated by any suitable apparatus, a part of the same being ground to an impalpable powder and colored with metallic oxides, to be used for painting upon the unfrosted parts of the articles of glass landscapes, flowers, and any other designs, C. The article is then placed in a muffle and exposed to the heat of a decorating-furnace until the fusion of the composition employed for decorating the surface takes place. The rear side of the painted portions may be covered by an enamel, D, made of the same material as the composition, so that thus a variegated effect is produced, as the articles have partly a frosted surface and partly a smoothly-decorated surface, which is transparent to the light, but opaque when seen in daylight.

One advantage of our improved process is that the laying on of the granulated part of the surface can be done at one time and the rest at another time until the entire surface is covered. Another advantage is that frosted articles of any desired color and tint may be produced by coloring the composition accordingly. The artist can thereby produce a variety of effects which cannot be produced by the old processes for frosting glassware. The main advantage, however, is that the entire article, after being decorated by the granulated and colored compositions and by the layer of enamel at the back, can be completed in one fire without injury to any part thereof, as all the compositions used in the decorating process are of the same material and will fuse at the same degree of heat.

Having thus described our invention, we claim as new and desire to secure by Letters Patent—

1. A composition for decorating the surface of glassware, consisting of red lead, granulated quartz, boric acid, potash, and bismuth, substantially as described.

2. The method herein described of decorating the surface of glassware, consisting of the application with a suitable flux of a layer of composition of red lead, granulated quartz, boric acid, potash, and bismuth, then placing it in a muffle and exposing it to the heat of a furnace until the fusion of the composition takes place, substantially as described.

3. The process herein described of decorating the surface of glassware, consisting of first frosting a portion of it with a colored composition of red lead, granulated quartz, boric acid, potash, and bismuth, and, second, of painting the unfrosted portions of it with a part of like composition ground to an impalpable powder and colored with metallic oxide, and then exposing to the heat of a decorating-furnace until the fusion of the composition takes place, substantially as described.

4. As an article of manufacture, glassware having portions of its surface frosted with composition, as herein described, and unfrosted portions painted with like composition ground and colored with metallic oxide, substantially as described.

In testimony that we claim the foregoing as our invention we have signed our names, in presence of two witnesses, this 23d day of September, 1881.

BENJAMIN BENAS.
JOSEF FLÖGEL.

Witnesses:
PAUL GOEPEL,
CARL KARP.